United States Patent Office 3,741,960
Patented June 26, 1973

3,741,960
AMIDINOUREIDO CYCLOALIPHATIC PENICILLINS
Harvey E. Alburn, West Chester, and William Dvonch, Radnor, Pa., assignors to American Home Products Corporation, New York, N.Y.
No Drawing. Filed Aug. 12, 1971, Ser. No. 171,367
Int. Cl. C07d 99/16
U.S. Cl. 260—239.1                         4 Claims

ABSTRACT OF THE DISCLOSURE

Amidinoureido cycloaliphatic penicillins are described as novel compounds for use as antibacterial agents, these compounds, being particularly useful in the treatment of infectious diseases caused by gram-positive and gram-negative bacteria, including those caused by Pseudomonas strains and Proteus strains and penicillin-resistant strains of Neisseria gonorrhoeae.

---

This invention relates to novel amidinoureido cycloaliphatic penicillins which are particularly useful in treating infectious diseases caused by strains of the Pseudomonas and Proteus genus and penicillin-resistant strains of Neisseria gonorrhoeae.

Accordingly, one aspect of the present invention relates to novel amidinoureido cycloaliphatic penicillins.

Another aspect of the present invention relates to the use of the novel amidinoureido cycloaliphatic penicillins in the treatment of infections caused by gram-positive and gram-negative bacteria.

Yet, another aspect of the present invention relates to the use of the novel amidinoureido cycloaliphatic penicillins against infections caused by Pseudomonas aeruginosa strains and penicillin-resistant strains of Neisseria gonorrhoeae.

These and other aspects of our invention will be apparent from the following description.

The novel compounds of the present invention have the formula:

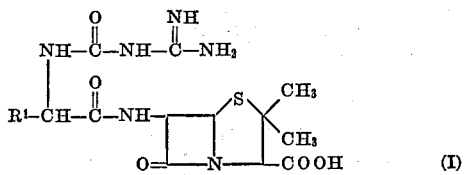

wherein $R^1$ is selected from the class consisting of cycloalkyl radicals having four to ten carbon atoms in the ring, cyclohexenyl and cyclohexadienyl. Illustrative of the cycloalkyl radicals defined by $R^1$ are cyclobutyl, cyclopentyl, cyclohexyl, cyclooctyl, etc.

The preferred compounds of the present invention have the formula:

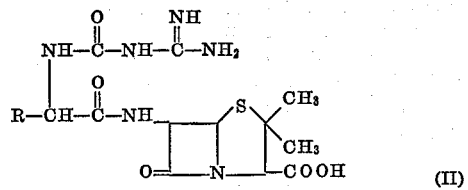

wherein R is selected from the class consisting of:

The broken line represents a single double bond in any one of the designated positions. The letter "S" means that the nucleus is saturated.

As will be understood by those skilled in the art, the penicillin compounds of the invention may be utilized in their acid form or in the form of the therapeutically-active salts thereof, e.g., the sodium or potassium salts, or hydrochloride, sulfate, fumarate, etc., or in the form of the pharmaceutically-acceptable, non-toxic salts prepared by the reaction of the penicillin compounds with an amine or diamine base, e.g., procaine or various N-N'-disubstituted alkylene diamines, such as N,N'-dibenzylethylenediamine, etc.

The α-carbon atom of the penicillin side chain (to which the 3-amidinoureido group is attached) is an asymmetric carbon atom and the substituent acids of this invention can therefore exist in two optically active isomeric forms [the D- and L-enantiomers], as well as the DL form which is a mixture of the two optically active forms; all such isomers are included with the compounds defined by Formula I and II, the preferred isomer being the D form.

The compounds of the present invention are prepared by reacting a compound of the formula:

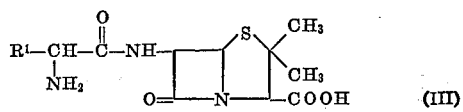

wherein $R^1$ is the same as defined in Formula I; with amidinosemicarbazide in the ratio of 1 to about 3 moles of said amidinosemicarbazide per mole of a compound of Formula III, in the presence of water and a base such as triethylamine, pyridine, etc.

The amidinosemicarbazide may be prepared by methods known in the art such as described by Thiele and Uhlfelder, Ann., 303, 110 (1898) and a procedure for preparing this compound is described in columns 4 and 5 of U.S. Patent 3,579,501 which discloses amidinoureido aromatic penicillins.

Compounds of Formula III may be prepared by the procedure described in Examples 1, 3, and 5 below. Compounds embraced by Formula III may also be prepared by procedures described in U.S. Pat. 3,485,819, the disclosure of which is incorporated herein by reference.

The compounds of this invention are generally recovered in thef orm of a hydrate (i.e., mono, di, or trihydrate). If desired, the recovered compound may be converted to its anhydrous form by procedures known in the art such as described in U.S. Pat. 3,144,445. Therefore, reference to the novel compounds of this invention is intended to embrace both the anhydrous and hydrated forms.

The following examples are given by way of illustration only, and not in limitation of the present invention.

EXAMPLE 1

6-[D-2-amino-2-(1,4-cyclohexadien-1-yl)acetamido] penicillanic acid (a) D-α-amino-1,4-cyclohexadiene-1-acetic acid (3.97 g. 26 mM.) is suspended in carbon tetrachloride (200 ml.), and the suspension chilled to 0° C. Phosphorous pentachloride (10.8 g., 52 mM.) is added with stirring and the suspension is allowed to come to room temperature. After eighteen hrs. the product is filtered off, washed with ether, and dried over silica-gel, the product being identified as the acid chloride hydrochloride salt of D-α-amino-1,4-cyclohexadiene-1-acetic acid.

(b) 6-aminopenicillanic acid (0.98 g., 4.6 mM.) is suspended in water (25 ml.) and the pH is adjusted to 6.0 with sodium hydroxide. Acetone (50 ml.) is added, and the solution is chilled to 0° C. The acid chloride hydrochloride salt of D-α-amino-1,4-cyclohexadiene-1-acetic acid (1.44 g., 6.9 mM.) is added in ten portions over a thirty-minute period. The pH is adjusted to 5.5 and the above titled penicillin isolated by isoelectric precipitation in a yield of 58%.

EXAMPLE 2

6-[D-2-(3-amidinoureido)-2-(1,4-cyclohexadien-1-yl)-acetamido]penicillanic acid hydrate An ice-cold solution of 6-[D-2-amino-2-(1,4-cyclohexadien-1-yl)acetamido]pencillianic acid of Example 1(b) (9.23 g., 26.25 mM.) is prepared in water (350 ml.) by adjustment of the pH to 9.0 with triethylamine until solution is effected and then readjustment with dilute hydrochloric acid to pH 7.5. To this solution is added a solution prepared by dissolving amidinosemicarbazide dihydrochloride (5.00 g., 26.25 mM.) in water (30 ml.) and treating it at ice-bath temperature with sodium nitrite (1.81 g., 26.25 mM.) in water (7 ml.) for 10 min. The mixture is adjusted to pH 7.2 and stirred and chilled for 45 min. The precipitate is filtered off (0.8) and the solution is stored at 5° C., overnight. The precipitate is filtered off and dried in vacuo over silica gel. The precipitate is 3.3 g. (6.9 mM., 26%) of the above titled compound.

Analysis.—Cal'd for $C_{18}H_{24}H_6O_5S \cdot 2\frac{1}{2}H_2O$ (percent): C, 44.90; H, 6.07; N, 17.45; S, 6.66. Found (percent): C, 44.84; H, 5.39; N, 17.70; S, 6.61.

More material may be obtained by further concentration. This material and the initial precipitate contain unreacted pencillin starting material. A pure product may be obtained by leaching out the unreacted penicillin as follows: 0.50 g., material is treated with 150 ml. water at pH 7.4 for 30 min. to give 0.33 g., of the pure amidinoureido derivative.

EXAMPLE 3

6-[D-amino-2-(1-cyclohexen-1-yl)acetamido]penicillanic acid

Dihydroampicillin (Example 1(b) supra, 3.53 g.) is suspended in water (120 ml.) and dissolved by adjusting the pH to 8.5. This pencillin is hydrogenated to the tetrahydroampicillin in five minutes in a low pressure hydrogenation apparatus with 5% palladium on carbon (2.0 g.) as catalyst. After removal of the catalyst and adjustment of the pH to 5, the solution was freeze-dried to give the above titled penicillin.

EXAMPLE 4

6-[D-2-(3-amidinoureido)-2-(1-cyclohexene-1-yl)-acetamido]penicillanic acid hydrate An ice-cold solution of 6-[D-2-amino-(1-cyclohexene-1-yl)acetamido]penicillanic acid (Example 3); (9.28 g., 26.25 mM.) is prepared in water (70 ml.) by adjustment of the pH to 9.0 with triethylamine until solution is effected and then readjusted with dilute hydrochloric acid to pH 7.5. To this solution is added a solution prepared by dissolving amidinosemicarbazide dihydrochloride (5.00 g., 26.25 mM.) in water (30 ml.) and treating it at ice-bath temperature with sodium-nitrite (1.81 g., 26.25 mM.) in water (7 ml.) for 10 min. The mixture is adjusted to pH 7.2 and stirred and chilled for 45 min. The precipitate is filtered off and dried in vacuo over silica gel. The precipitate is the above titled compound in a yield of 48%.

Analysis.—Calc'd for $C_8H_{26}N_6O_5S \cdot 3H_2O$ (percent): C, 43.9; H, 6.6; N, 17.1; S, 6.5. Found (percent): C, 43.7; H, 5.8; N, 16.6; S, 6.4.

EXAMPLE 5

6-[D-2-amino-2-(cyclohexyl)acetamido]penicillanic acid (a) Hydrogen chloride gas is passed through a suspension of D-α-aminocyclohexaneacetic acid (7.85 g., 50 mM.) in methylene chloride (160 ml.) at 5–10° C. for 20 min. with stirring. Phosphorous pentachloride (16.6 g., 755 mM.) is added in portions, and the mixture is stirred for 4 hrs. at 0–5° C. The product is filtered off, washed with methylene chloride, and dried over silica-gel to give the acid chloride hydrochloride salt of D-α-aminocyclohexaneacetic acid.

(b) 6-aminopenicillanic acid (2.16 g., 10 mM.) is added to methylene chloride (100 ml., dried with aluminum oxide) and followed by N,N-bis(trimethylsilyl)acetamide (2.45 ml., 10 mM.). The reaction mixture is stirred one hr. at room temperature, then cooled to 0–10° C., and N, N-dimethylaniline (1.28 ml., 10 mM. mole) is added. The acid chloride hydrochloride salt of D-α-aminocyclohexaneacetic acid (2.12 g., 10 mM. mole) is added over half an hour at 0–10° C., and then mixture is let warm to room temperature over one hour and then kept at 5° C., overnight.

The reaction mixture is added to water (200 ml.). After separation of the phases, the organic layer is washed with water, and the water extracts combined, neutralized to pH 8 in the cold with sodium carbonate. The N,N-dimethylaniline is extracted with ether, and the water phase is adjusted to pH 4.6 and the penicillin isolated, this product being 6 - (D-2-amino-2-cyclohexylacetamido)penicillanic acid.

EXAMPLE 6

6-[D-2-(3-amidinoureido)-2-(cyclohexyl)acetamido]-penicillanic acid

The above titled compound is prepared using the procedure of Example 4 by reacting the compound of Example 5(b) with amidinosemicarbazide.

EXAMPLE 7

The following compounds within the scope of the present invention may be prepared in accordance with the procedure of Examples 1 and 2 by reacting amidinosemicarbazide with an appropriate 6 - [D-2-amino-2-(cycloalkyl)acetamido]penicillanic acid.

| Penicillin reactant | Product |
| --- | --- |
| 6-[D-2-amino-2-(cyclopentyl)-acetamido]penicillanic acid. | 6-[D-2-(3-amidinoureido)-2-(cyclopentyl)acetamido]-penicillanic acid. |
| 6-[D-2-amino-2-(cyclooctyl)-acetamido]penicillanic acid. | 6-[D-2-(3-amidinoureido)-2-(cyclooctyl)acetamido]- penicillanic acid. |
| 6-[D-2-amino-2-(cyclobutyl)-acetamido]penicillanic acid. | 6-[D-2-(3-amidinoureido)-2-(cyclobutyl)acetamido]-penicillanic acid. |

The compounds of this invention have a broad spectrum of antibacterial activity against both gram-positive and gram-negative organisms including *Pseudomonas aeruginosa, Proteus vulgaris, Staphylococcus aureus, Escherichia coli*, etc.

Thus the compounds of this invention may be used in cleaning or disinfecting compositions or otherwise combat infections due to organisms such as those named above. In cleaning or disinfecting compositions, e.g., dairy barns, a concentration of about 0.01 to 1% by weight of such compounds dissolved or suspended in a suitable inert carrier for application by washing or spraying may be used. In the treatment of bacterial infections in man, the compounds of this invention are administered topically, orally and parenterally, preferably parenterally, in accordance with conventional procedures for antibiotic administration in an amount of from about 5 to 125 mg./kg./day and preferably in the range of 15 to 75 mg./kg./day for pseudomonas infections in divided dosages, e.g., three or four times a day. They are administered in dosage units containing, for example, 125, 250 and 500 mg. of active ingredient with suitable physiologically acceptable carriers or excipients. The dosage units can be in the form of liquid preparations such as solutions, dispersions, emulsions or in solid form such as tablets, capsules, etc., such as those described in U.S. Pats. 3,144,445 and 2,745,785.

The compounds of Formula I of this invention are tested for in vitro antibacterial activity as follows. Antibacterial screening is carried out by an agar serial dilution technique. Distilled water is used as a vehicle. The stock solution is prepared at 1,000 μg./ml. of substance in the vehicle. Two-fold dilutions are made with sterile water. One ml. quantities of each dilution are incorporated into 9 ml. seed agar in sterile Petri dishes. The hardened surface is inoculated with test organisms and incubated 18 hours at 35° C. The end point is reported as a minimal inhibitory concentration (MIC) expressed in μg./ml. the least amount of test substance that will completely inhibit the test organism.

The following table represents the results of in vitro tests as described supra, against thirty-six strains of *Pseudomonas aeruginosa* using the compounds of Examples 2 and 4.

TABLE I

|  | Compound of— | |
|---|---|---|
|  | Example 2 | Example 4 |
| MIC (μg./ml.):* | | |
| 125 |  | 1 |
| 62.5 |  | 4 |
| 31.3 | 1 | 4 |
| 15.6 | 10 | 12 |
| 7.81 | 10 | 9 |
| 3.90 | 10 | 7 |
| 1.95 | 4 |  |

*Range of test 0.0009–1000 μg./ml.

The following table shows the MIC of the compound of Example 2 against various Proteus strains.

TABLE II

| Organism | Strain | MIC (μg./ml.) |
|---|---|---|
| *Proteus vulgaris* | 9920 | 0.488 |
| *Proteus morganii* | 8019 | 125 |
| *Proteus mirabilis* | 9921 | 0.976 |

The in vivo antibacterial activity of compounds of this invention has been substantiated in mice. The compound of Example 2 was administered to male mice weighing 16–18 grams (MBR strain). Mice are injected intraperitoneally with 0.5 ml. of a standardized suspension of the infective agent in 5% gastric mucin and randomized. Six hours post-infection a single dose of the selected penicillin compound is given subcutaneously. The animals are observed for 14 days and deaths recorded daily. The curative dose ($CD_{50}$) is determined by the method of Reed & Muench, American Journal of Hygiene 27 493 (1938).

The results ($CD_{50}$) are reported below in Table III.

TABLE IV

Mean sensitivity of 23 strains of *Neisseria gonorrhoeae* to various penicillins

| Penicillin | Minimal inhibitory concentration (μg./ml.) | |
|---|---|---|
|  | Penicillin-sensitive (11 strains) | Penicillin-resistant (12 strains) |
| Penicillin G | 0.0320 | 0.329 |
| Ampicillin | 0.0835 | 0.224 |
| Compound of Ex. 1 of this application | 0.0514 | 0.203 |
| Compound of Ex. 2 of this application | <0.0015 | 0.007 |
| Compound of Ex. 3 of this application | 0.1665 | 0.651 |
| 6-[D-2-(3-amidinoureido)-2-phenylacetamido]penicillanic acid, monohydrate | 0.0465 | 0.275 |

In all of the twenty-three strains of *Neisseria gonorrhoeae* treated, the results of which are summarized in Table IV above, the compound of Example 2 namely, 6-[D-2,3-amidinoureido) - 2 - (1,4-cyclohexadien-1-yl)acetamido]penicillanic acid exhibited a lower MIC value against each strain than each of the other compounds tested against the same strain. The highest MIC value exhibited by the compound of Example 2 against any of the twenty-three strains was 0.152 μg./ml.

Another series of 8-penicillin-sensitive and 14-penicillin-resistant strains of *Neisseria gonorrhoeae* to certain penicillins were tested as previously described, as summarized below.

TABLE V

Mean sensitivity of 22 strains of *Neisseria gonorrhoeae* to various

| Penicillin | Minimal inhibitory concentration (μg./ml.) | |
|---|---|---|
|  | Penicillin-sensitive (8 strains) | Penicillin-resistant (14 strains) |
| Penicillin G | 0.0446 | 9.366 |
| Ampicillin | 0.0667 | 0.279 |
| 6-[2-(1,4-cyclohexadienyl-1-yl)-acetamido]penicillanic acid [1] | 0.0743 | 0.749 |
| Compound of Ex. 2 of this application | [2] 0.0143 | 0.053 |

[1] Described in co-pending application Ser. No. 75,261.
[2] 7 strains.

In all of the twenty two strains of *Neisseria gonorrhoeae* tested which are summarized in Table V, the compound of Example 2 exhibited a lower MIC value against each strain than each of the other compounds tested against the same strain. The highest MIC value

TABLE III

| Penicillin | *S. typhem.* SaB-1 | *E. coli* 920 | Proteus 3 | Proteus 347 | Pseudomonas YED |
|---|---|---|---|---|---|
| Compound of Ex. 2 of this application | <1.80 | 0.33 | 0.21 | 0.27 | 6.1 |
| 6-[D-2-(3-amidinoureido)-2-phenyl-acetamido]penicillanic acid [1] | 3.6 | 0.28 | 0.12 | 0.34 | 8.3 |
| Carbenicillin | 3.6 | 0.62 | 0.62 | 0.83 | 25.3 |
| Compound of Ex. 1 of this application [2] | <1.80 | 0.23 | 0.62 | 0.65 | 25.7 |
| Ampicillin | 1.80 | 0.27 | 0.17 | 0.30 | >28.8 |

[1] Described in U.S. Pat. 3,579,501.
[2] Described in U.S. Pat. 3,485,819.

The novel compounds of this invention have also been found particularly effective against penicillin-resistant strains and penicillin-sensitive of *Neisseria gonorrhoeae* when compared with penicillin G and ampicillin. The sensitives of the penicillin-resistant strains of *Neisseria gonorrhoeae* were determined by an agar dilution method in general accordance with a standardized procedure recommended by the Public Health Service and published in PHS publication No. 499 (revised 1960). The mean sensitivity of the penicillins tested is reported on an active moiety basis in Table IV below.

exhibited by the compound of Example 2 was 0.122 μg./ml.

In the treatment of *Neisseria gonorrhoeae* in human beings the compounds of this invention are preferably administered parenterally, although oral administration may be employed. The dose to be administered is a variable of numerous factors including the severity of the condition being treated, size and age of the patient, whether the patient is available for maintenance dose treatment and the particular characteristics of the individual patient. Generally the compounds are administered in an amount from about 1 mg. to 75 mg. per kg./day and preferably in the range of 5 mg. to 30 mg./kg./day in a single dose. Formulation of suitable injectionable compositions may be made in the same manner as other penicillins including injectable forms of ampicillin. Examples of typical formulations are found in U.S. Patent No. 2,745,785.

The novel penicillins of the invention may be used in combination with other therapeutic agents in a manner that will be obvious to those skilled in the art. For example, in the treatment of *Neisseria gonorrhoeae*, the amidinoureido penicillins described herein can be administered in conjunction with Probenecid (di-propylsulfamyl benzoic acid).

What is claimed is:

1. A member selected from the group consisting of the compounds having the formula

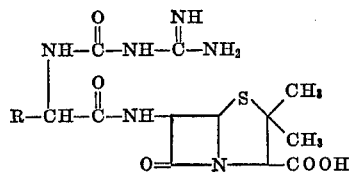

wherein R is a member selected from the group consisting of

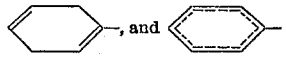

and their non-toxic addition salts, said dotted lines indicating a single double bond.

2. A compound in accordance with claim 1 which is 6[D-2-(3-amidinoureido) - 2 - (1,4-cyclohexadiene-1-yl) acetamido] penicillanic acid.

3. A compound according to claim 1 which is 6[D-2-(3-amidinoureido) 2-(1-cyclohexene-1-yl) acetamido] penicillanic acid.

4. A compound according to claim 1 which is in a hydrated form.

References Cited
UNITED STATES PATENTS

| | | | |
|---|---|---|---|
| 3,579,501 | 5/1971 | McGregor et al. | 260—239.1 |
| 3,406,185 | 10/1968 | Patchett et al. | 260—239.1 |

NICHOLAS S. RIZZO, Primary Examiner

U.S. Cl. X.R.

424—271